US007355756B2

(12) United States Patent
Fujita

(10) Patent No.: US 7,355,756 B2
(45) Date of Patent: Apr. 8, 2008

(54) COLOR ELECTROPHOTOGRAPHIC APPARATUS AND METHOD OF PROCESSING AN IMAGE PRODUCED THEREBY

(75) Inventor: Toru Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 795 days.

(21) Appl. No.: 10/821,946

(22) Filed: Apr. 12, 2004

(65) Prior Publication Data
US 2004/0190031 A1 Sep. 30, 2004

Related U.S. Application Data

(63) Continuation of application No. 09/497,518, filed on Feb. 4, 2000, now Pat. No. 6,791,715.

(30) Foreign Application Priority Data
Feb. 5, 1999 (JP) ............... P. 11-028666

(51) Int. Cl.
*G06K 15/00* (2006.01)
(52) U.S. Cl. .................. 358/3.2; 358/3.3; 358/534
(58) Field of Classification Search ............. 358/1.9, 358/2.1, 3.22, 3.3, 534, 3.01, 3.06, 3.2, 3.11
See application file for complete search history.

(56) References Cited

U.S. PATENT DOCUMENTS 4,486,788 A 12/1984 Yamada

| 5,327,167 | A | * | 7/1994 | Pollard et al. | 358/3.3 |
|---|---|---|---|---|---|
| 5,828,463 | A | * | 10/1998 | Delabastita | 358/3.17 |
| 5,892,891 | A | * | 4/1999 | Dalal et al. | 358/1.9 |
| 6,121,997 | A | * | 9/2000 | Fukushima | 347/261 |

FOREIGN PATENT DOCUMENTS

| DK | 19722697 | * | 12/1998 |
|---|---|---|---|
| EP | 430860 | * | 6/1991 |
| EP | 499738 | * | 8/1992 |
| EP | 0 583 776 A2 | | 2/1994 |
| EP | 634862 | * | 1/1995 |
| EP | JP 8-69139 | * | 3/1996 |
| EP | 843232 | * | 5/1998 |
| JP | 08-023452 | | 1/1996 |
| JP | 10-75375 | | 3/1998 |

* cited by examiner

*Primary Examiner*—Jerome Grant, II
(74) *Attorney, Agent, or Firm*—Sughrue Mion, PLLC

(57) ABSTRACT

An image reproduction engine which causes toner to adhere to a development region of certain area located at a certain position within dots according to image reproduction data is utilized for image processing, wherein a halftone is expressed by means of halftone spots formed from a plurality of dots. The centroid of the halftone spot formed from a single dot or a plurality of adjacent dots is shifted from the center of the dot to an arbitrary position, thus achieving desired screen angles or desired pitches of halftone spots. As a result, screen angles related to an irrational tangent can be realized, and the pitches of halftone spots of a plurality of color screens can also be made uniform.

3 Claims, 12 Drawing Sheets

METHOD OF DEFINING SCREEN ANGLES

EXAMPLE OF GROWN HALFTONE SPOTS ACCORDING TO FIRST EMBODIMENT

ANGLES OF CMYK SCREENS

METHOD OF DEFINING SCREEN ANGLES

EXAMPLE OF HALFTONE SPOT ACCORDING TO THE INVENTION

FIG. 6

| 1 | 2 | 3 | 4 | 5 | 6 | 7 | 8 | 9 | 10 | 11 | 12 |
|---|---|---|---|---|---|---|---|---|---|---|---|
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 |
| 109 | 110 | 111 | 112 | 113 | 114 | 115 | 116 | 117 | 118 | 119 | 120 |
| 121 | 122 | 123 | 124 | 125 | 126 | 127 | 128 | 129 | 130 | 131 | 132 |
| 133 | 134 | 135 | 136 | 137 | 138 | 139 | 140 | 141 | 142 | 143 | 144 |

EXAMPLE OF PATTERN MATRIX
ACCORDING TO FIRST EMBODIMENT

FIG. 9

| | | | | | | | | | | | |
|---|---|---|---|---|---|---|---|---|---|---|---|
| 1 | 2 | 3 | 1 | 4 | 5 | 6 | 7 | 8 | 9 | 4 | 10 |
| 11 | 12 | 13 | 9 | 14 | 15 | 1 | 6 | 13 | 6 | 7 | 16 |
| 4 | 8 | 17 | 18 | 12 | 19 | 20 | 5 | 15 | 1 | 14 | 3 |
| 14 | 21 | 15 | 20 | 16 | 9 | 18 | 22 | 17 | 11 | 16 | 15 |
| 23 | 10 | 9 | 5 | 3 | 24 | 6 | 10 | 9 | 18 | 8 | 6 |
| 8 | 25 | 11 | 23 | 10 | 20 | 8 | 3 | 26 | 17 | 21 | 9 |
| 27 | 15 | 6 | 16 | 28 | 11 | 12 | 2 | 11 | 29 | 3 | 1 |
| 16 | 9 | 8 | 13 | 15 | 17 | 10 | 26 | 11 | 22 | 17 | 18 |
| 25 | 20 | 30 | 5 | 6 | 22 | 13 | 24 | 31 | 21 | 26 | 4 |
| 32 | 33 | 5 | 21 | 4 | 23 | 14 | 4 | 12 | 13 | 1 | 14 |
| 33 | 4 | 14 | 15 | 17 | 10 | 3 | 4 | 22 | 2 | 11 | 34 |
| 6 | 7 | 8 | 6 | 35 | 5 | 24 | 36 | 27 | 15 | 20 | 8 |

Labels: D1,1 ; D1,4 ; D2,7 ; D3,10 ; D7,12 ; D10,12 ; D10,11

EXAMPLE OF PATTERN MATRIX
ACCORDING TO SECOND EMBODIMENT

EXAMPLE OF GROWN HALFTONE SPOTS
ACCORDING TO SECOND EMBODIMENT

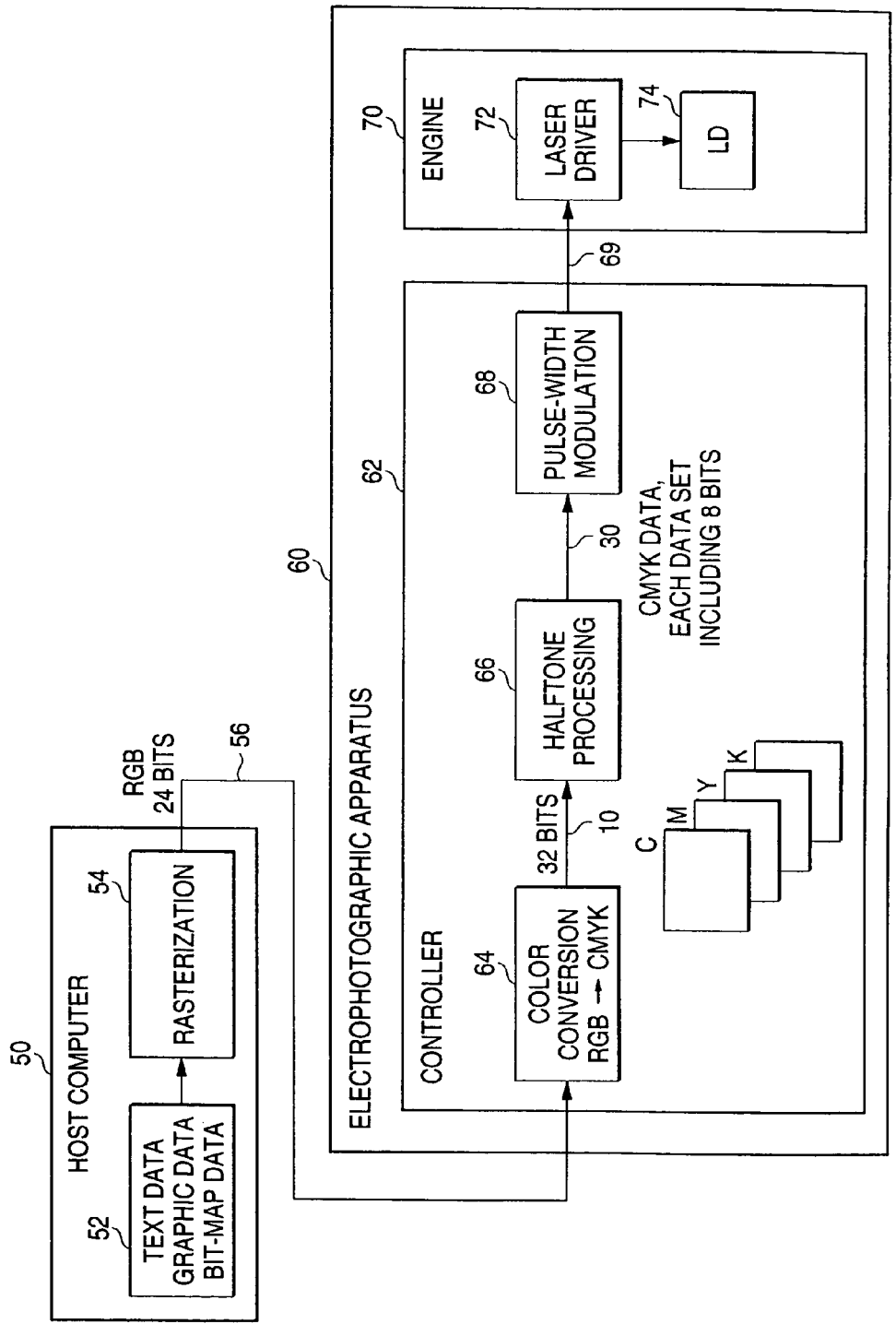

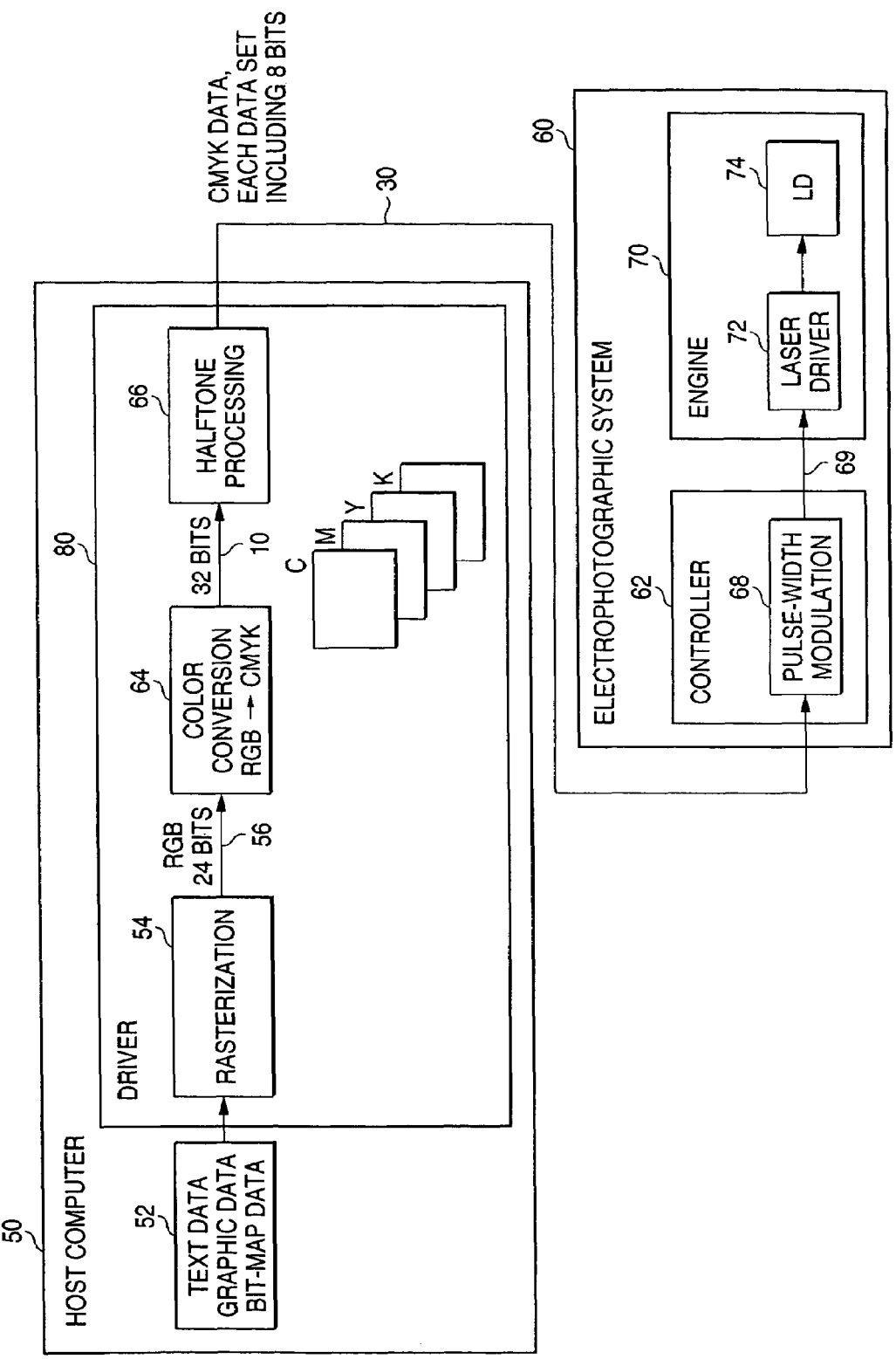

COLOR ELECTROPHOTOGRAPHIC APPARATUS AND METHOD OF PROCESSING AN IMAGE PRODUCED THEREBY

This is a continuation of application Ser. No. 09/497,518 filed Feb. 4, 2000 now U.S. Pat. No. 6,791,715; the disclosure of which is incorporated herein by reference.

BACKGROUND OF THE INVENTION

1. Field of the Invention

The present invention relates to a color electrophotographic apparatus which performs halftoning operations through use of halftone spots formed by a plurality of dots, a method of processing an image produced by the color photographic apparatus, and a recording medium having recorded thereon a program to be used for image processing. In this specification, the word "dot" implies "pixel" defined as a unit cell in electrophotographic apparatuses.

The present application is based on Japanese Patent Application No. Hei. 11-28666, which is incorporated herein by reference.

2. Description of the Related Art

In an electrophotographic apparatus, such as a color printer or a color copier, a color image is reproduced by utilization of cyan toner, magenta toner, yellow toner, and black toner. Particularly, among color printers, some page printers—which forms a latent image on a photosensitive drum by utilization of a laser beam, develop the latent image by use of charged toner, and transfer an image formed from the thus developed toner onto transfer paper—can change an area to be exposed by the laser beam within a dot in various manners. Thus, even when the number of dots per unit area is small, those page printers can reproduce a color image with high resolution and high gradation.

In such a color electrophotographic apparatus, a dithering method has been widely utilized as a binary-coding method to be used for reproducing the halftone of a gray-scale image. According to the dithering method, by reference to conversion tables which are called dither matrices or threshold-value matrices and which define the correspondence between halftone data and image production data, a determination is made as to whether color spot is displayed in each dot or not. A dot is 'ON' when color spot is displayed and "OFF" when color spot is not displayed. Halftone spots are produced by one dot or some adjacent dots turning "ON", and halftones of the images are reproduced on the basis of the sizes of halftone spots.

Dots are arranged in the direction of primary scanning in which a laser beam is moved for scanning (hereinafter referred to simply as a "primary-scanning direction") and in the direction of secondary scanning in which transfer paper is fed (hereinafter referred to simply as a "secondary-scanning direction"). As some dots become "ON" and thus form the "core of the growth" of halftone spots. As the gray-scale level of the halftone data is increased further, the number of "ON" dots is eventually increased, thus gradually enlarging the size of the halftone spots.

FIG. 1 shows the combination of the angle of a cyan screen, the angle of a magenta screen, the angle of a yellow screen, and the angle of black screen, which has conventionally been used in wide applications of industrial printing systems. As shown in the drawing, according to the conventional technique, the angles of four color screens are set; specifically, the angle of the yellow (Y) screen is set to 0°; the angle of the cyan (C) screen [or the angle of the magenta (M) screen] is set to 15°; the angle of the black (K) screen is set to 45°; and the angle of the magenta (M) screen [or the angle of the cyan (C) screen] is set to 75°.

It is also known that, if the screen angles of the halftone spots are shifted in order to prevent chromatic misregistration, a so-called moiré pattern appears. It has empirically been acknowledged that a shift of angle of about 30° between two color screens is optimal for increasing the spatial frequency of the moiré pattern, to thereby render the moiré pattern inconspicuous. Yellow is less noticeable to the human eye. Therefore, the other 3 color screens (C,M,K) are set shifted from each other by 30°. Further, the angle of the black screen, which is most noticeable to the human eye, is set to 45°, so as be most distant from a longitudinal angle of 0° and a horizontal angle of 90°, which are easily recognized by the human eye. The angle of the cyan screen is set to 15°, and the angle of the magenta screen is set to 75°. The angle of the yellow screen is set to 0°. Although the yellow screen is set to the longitudinal direction or the horizontal direction that are most noticeable to the human eye, the yellow screen does not become greatly noticeable, because yellow is least noticeable to the human eye.

As mentioned above, the industrial printing system is designed so as to prevent a moiré pattern by setting the magenta or cyan screen to an angle of 15° or 75° and rotating the color screens. Since the color screens are only rotated, exactly as they are, the pitch among halftone spots is maintained uniform throughout the 4 colors.

In an electrophotographic apparatus utilizing a laser beam, the pattern of dots, which can be developed by an engine for developing an actual image on the basis of image reproduction data, is limited to the direction of primary scanning in which a laser beam is actuated for scanning, as well as to the direction of secondary scanning in which paper is fed. Unlike the industrial printing system, the electrophotographic apparatus is incapable of rotating the color screens to arbitrary angles. Accordingly, in the electrophotographic apparatus, desired screen angles are achieved by shifting the positions of the dither matrices to be used for the dithering method in primary or secondary scanning direction, or by changing the data in the conversion table, as required.

FIG. 2 is an illustration for describing a conventional method of determining screen angles in dithering method. In this example, dither matrices 40, each measuring m×m, are shifted from one another so as to correspond to image data, thus achieving a screen angle θ; i.e., tan θ=b/a. In a more specific example shown in FIG. 2, dither matrices 40 are shifted such that in a horizontal row of dither matrices 40, each dither matrix 40 is vertically shifted from the preceding dither matrix 40 by a given amount, such that after four shifts the last dither in the row is vertically shifted by an amount corresponding to the height of one dither matrix 40. Therefore, we have tan θ=¼. A dither matrix 42 designated by broken lines comprises a plurality of dither matrices 40. It is possible to determine the screen angle at an arbitrary value with higher degree of freedom by means of such a large dither matrix 42.

A screen angle of 15° for magenta and a screen angle of 75° for cyan, which are deemed to contributed to the best picture quality in the printing industry, are related to an irrational tangent (i.e., a tangent which is an irrational number). Angles related to the irrational tangent cannot be reproduced, so long as a limited number of dots arranged in both the direction of primary scanning and the direction of secondary scanning are utilized. For this reason, in the conventional electrophotographic apparatus, the magenta screen and the cyan screen are set to angles which are related to a rational tangent [tan θ=a/b (where "a" and "b" are integers), and θ=15° and θ=75° are not related to the rational tangent] and close to an angle of 15° and an angle of 75°.

Another conceivable approach toward selecting angles which are related to the rational tangent and close to 15° and 75° is to increase the size of the dither matrices 42. However, the number of dots per unit area which the engine can process is as small as, e.g., 600 dpi (dots per inch). If the size of the dither matrices is increased, halftone spot pitch increases and screen frequency is diminished. Further, an increase in the size of dither matrices also results in an increase in the number of corresponding required γ tables. Such an increase in the number of γ tables in turn involves an increase in the volume of a recording medium for recording the conversion tables Eventually, the cost of the electrophotographic apparatus is increased.

In a case where halftone spots are formed by utilization of the dots fixedly arranged in both the direction of primary scanning of the laser beam (i.e., the primary-scanning direction) and the direction of secondary scanning of the same (i.e., the secondary-scanning direction), the pitch between halftone spots among the color screens of different angles cannot be made uniform. Even in this respect, the electrophotographic apparatus encounters difficulty providing the same picture quality as that provided by the industrial printing system.

SUMMARY OF THE INVENTION

An object of the present invention is to provide an electrophotographic apparatus capable of achieving screen angles related to an irrational tangent, a method of processing an image produced by the electrophotographic apparatus, and a recording medium on which an image processing program is recorded, with regard to a color electrophotographic apparatus which reproduces an image by utilization of halftone spots formed from a plurality of dots.

Another object of the present invention is to provide an electrophotographic apparatus capable of making uniform pitches of halftone spots in a screen compatible with a plurality of colors, a method of processing an image produced by the electrophotographic apparatus, and a recording medium on which an image processing program is recorded, with regard to a color electrophotographic apparatus which reproduces an image by utilization of halftone spots formed from a plurality of dots.

Still another object of the present invention is to achieve the objects through use of a reduced number of conversion tables.

An image reproduction engine which causes toner to adhere to a development region of certain area located at a certain position within dots according to image reproduction data is utilized for image processing, wherein a halftone is expressed by means of halftone spots formed from a plurality of dots. The centroid of a halftone spot formed from a single dot or a plurality of adjacent dots can be shifted from the center of the dot to an arbitrary position, thus achieving desired screen angles or desired dot pitches. As a result, screen angles related to an irrational tangent can be realized, and the pitches of halftone spots of a plurality of color screens can also be made uniform.

In the case of an electrophotographic apparatus which radiates a laser beam onto a region of dots while being scanned in a given direction, the present invention enables the position and area where the laser beam is radiated to be controllably changed to an arbitrary position and area for each dot, by producing a laser drive pulse signal according to image reproduction data by means of pulse-width modulation (PWM), as required.

In order to reduce the volume of conversion tables which are provided within a controller of an electrophotographic apparatus or a driver of the host and which define the correspondence between halftone data and image reproduction data, the present invention utilizes an index-type conversion table. The conversion table comprises a plurality of γ tables defining the correspondence between halftone data and image reproduction data, and a pattern matrix which includes reference data representing γ tables to be referred to so as to correspond to a matrix including a plurality of dots. By means of such a configuration, some of reference data sets in the pattern matrix can be identical, and a single γ table can be referred to by a plurality of dots within the pattern matrix.

To achieve the objects of the present invention, the present invention provides a color electrophotographic apparatus which reproduces an image by utilization of a plurality of color toners and by expressing halftone of each color through use of halftone spots formed from a plurality of dots, the apparatus comprising: a halftone processing section which is provided with halftone data for respective colors and which reproduces the image reproduction data corresponding to the dots on the basis of the halftone data by reference to a conversion table defining the correspondence between the halftone data prepared so as to correspond to the dots and image reproduction data; and an image reproduction engine which is provided with a drive signal corresponding to the image reproduction data and which causes the toners to adhere to a development region whose area and location correspond to the image reproduction data, within the dots, wherein the halftone processing section prepares the image reproduction data to be used for changing the angle of one color screen of the plurality of color screens to substantially an angle related to an irrational tangent.

Further, to achieve the objects, the present invention provides a color electrophotographic apparatus which reproduces an image by utilization of a plurality of color toners and by expressing halftone of each color through use of halftone spots formed from a plurality of dots, the apparatus comprising: a halftone processing section which is provided with halftone data for respective colors and which reproduces the image reproduction data corresponding to the dots on the basis of the halftone data by reference to a conversion table defining the correspondence between the halftone data prepared so as to correspond to the dots and image reproduction data, and an image reproduction engine which is provided with a drive signal corresponding to the image reproduction data and which causes the toners to adhere to a development region whose area and location correspond to the image reproduction data, within the dots, wherein the halftone processing section prepares the image reproduction data to be used for making the distances among the centers of the halftone spots of the plurality of colors substantially equal.

The present invention also provides a recording medium which reserves an image processing method for use with the foregoing electrophotographic apparatus and a program used for effecting image processing.

Features and advantages of the invention will be evident from the following detailed description of the preferred embodiments described in conjunction with the attached drawings.

BRIEF DESCRIPTION OF THE DRAWINGS

In the accompanying drawings:

FIG. 6 is an illustration showing an example of the pattern matrix according to the first embodiment;

FIG. 9 is an illustration showing an example of a pattern matrix according to the second embodiment;

FIG. 11 is a schematic diagram showing the configuration of an electrophotographic system; and FIG. 12 is a schematic diagram showing another configuration of the electrophotographic system.

DETAILED DESCRIPTION OF THE PREFERRED EMBODIMENTS

Embodiments of the present invention will be described hereinbelow by reference to the accompanying drawings. However, the illustrated embodiments shall not limit the technological scope of the invention.

Figure 3:
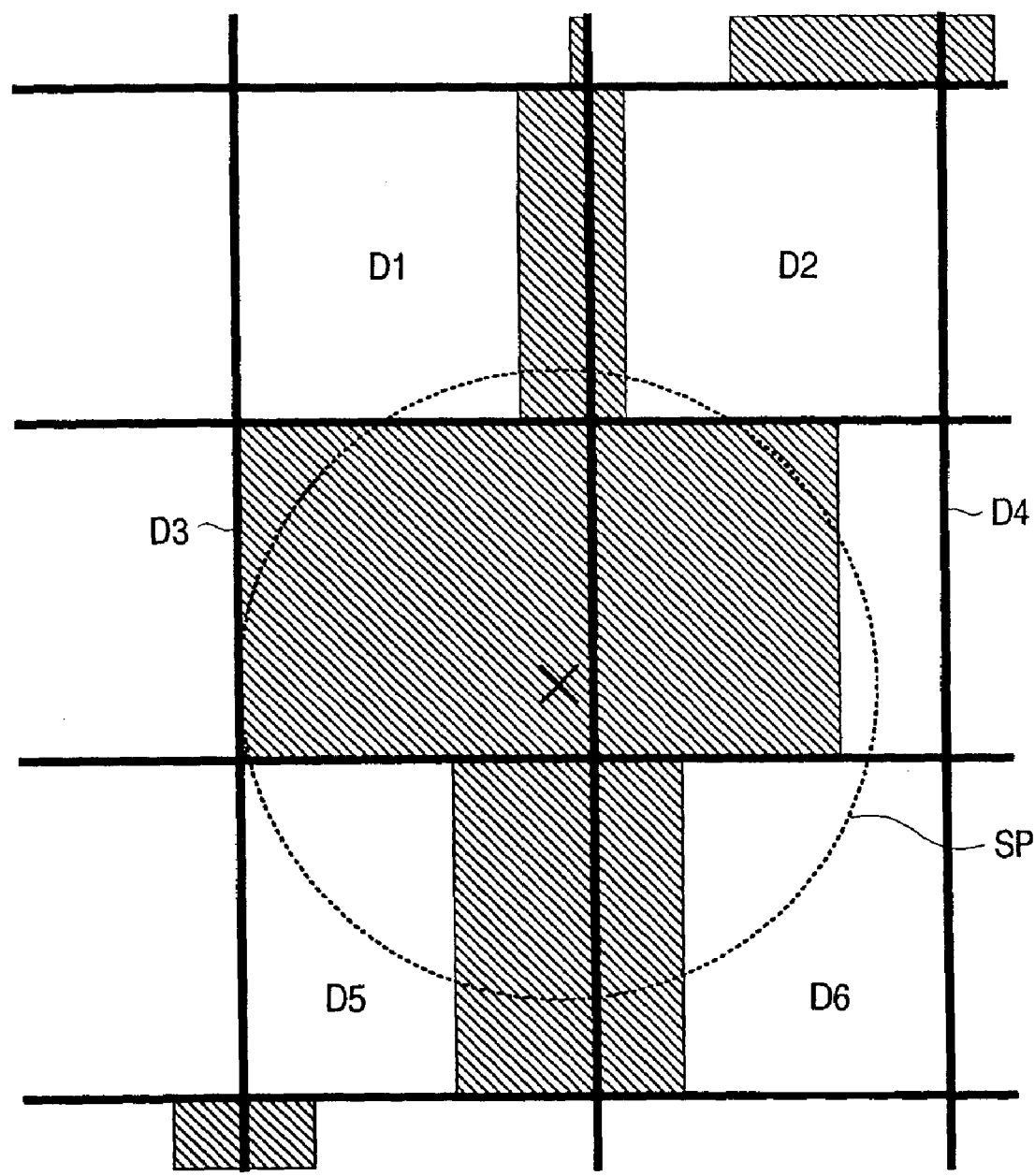
FIG. 3 is an illustration showing an example of halftone spot according to the first embodiment of the present invention.

FIG. 3 shows an example of a halftone spot according to the first embodiment of the present invention. In this example, a single halftone spot SP is produced by formation of a development region designated as a shaded area, within dots D1 to D6 produced at; e.g., 600 dpi. Formation of the halftone spot will be described by reference to electrophotographic system, in which a laser diode is activated on the basis of image reproduction data in accordance with a drive pulse modulated by a pulse-width modulation method, to thereby radiate a resultant laser beam.

The laser beam is radiated onto the dot D1 such that toner adheres to a region encompassing approximately the rightmost one-fourth of the dot (hereinafter called "rightmost one-fourth region"). The diameter of the laser beam is equal to; e.g., the longitudinal length of the dot, and the laser beam is radiated onto a desired region while being scanned in the transverse direction of FIG. 3. Accordingly, in the case of the dot D1, the drive pulse for driving the laser is imparted with a timing and a width corresponding to approximately the rightmost one-fourth region. The development position can be controlled by controlling the timing, and the area of development can be controlled by controlling the pulse width.

A dot D2 is adjacent to the dot D1, and the laser beam is radiated onto a region encompassing approximately the leftmost one-tenth of the dot D2. The development region of predetermined width is realized by connection of the irradiated region of the adjacent dot D1 to the irradiated region of the dot D2. The entirety of a dot D3 is exposed to the laser beam. The laser beam is radiated onto a region encompassing approximately the leftmost two-thirds of an adjacent dot D4. As a result, a wide development region is formed by connection of the irradiated region of the dot D3 to the irradiated region of the dot D4. Similarly, the laser beam is radiated onto a region encompassing approximately the rightmost one-half of a dot D5, and the laser beam is radiated onto a region encompassing approximately the leftmost one-fourth region of a dot D6.

The halftone spot SP shown in FIG. 3 is characterized in that the development region formed from the dots D1 and D2 is narrower than the development region formed from the dots D5 and D6 and that the development region formed from the adjacent dots D1 and D2, the development region formed from the adjacent dots D3 and D4, and the development region formed from the adjacent dots D5 and D6 are shifted leftward. As a result, the centroid of the halftone spot SP formed from the dots D1 to D6 (i.e., the center of the halftone spot SP) is placed in a position shifted slightly from the center of the dots D3 to D6 in an upward and leftward direction, as designated by X shown in the drawing.

In an engine for reproducing an image produced by an electrophotographic apparatus in which a drum is electrified by exposure to a laser beam and toner is adhered onto the thus-electrified drum, even if the laser beam is radiated onto the regions such as those shown in FIG. 3, the halftone spot SP to be finally reproduced becomes more rounded than the shaded region shown in FIG. 3, by means of the shape of the laser beam or the adhering characteristic of toner. The center of the halftone spot can be placed at an arbitrary position without regard to arrangement of dots, by setting the positions and areas within dots to be exposed to the laser beam, as required.

As mentioned above, a development region of arbitrary area can be produced at an arbitrary location within a dot, by means of controlling the timing and width of a pulse signal used for driving the laser. Utilization of such a development method and formation of a halftone spot through use of development regions of a plurality of dots enables controllable changing of the position of the halftone spot to an arbitrary position, without regard to the pitch and arrangement of dots. Thus, the present invention enables formation of a halftone spot at an arbitrary position and realization of screen angles related to an irrational tangent and arbitrary pitch of the halftone spots.

Figure 4:
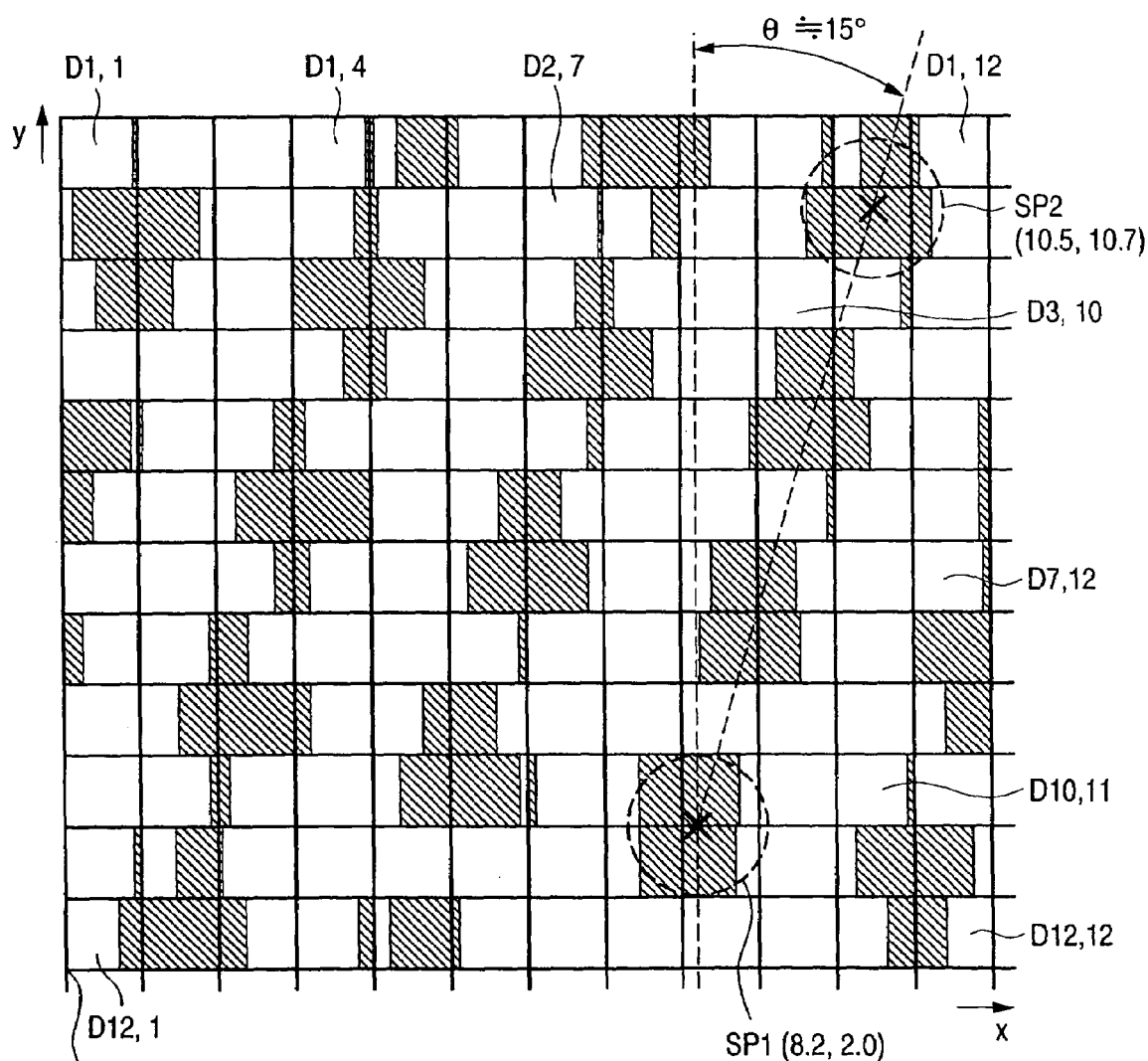
FIG. 4 is an illustration showing an example of a halftone spot which is formed on the basis of the foregoing principle and is grown according to the first embodiment.

FIG. 4 is an example of a halftone spot which is formed on the basis of the foregoing principle and is grown according to the first embodiment. FIG. 4 shows a plurality of halftone spots to be formed from dots $D_{1,1}$ to $D_{12,12}$ of a matrix pattern having 12 rows and 12 columns. As will be described later, a conversion table defining the correspondence between halftone data of dots and image reproduction data assumes the form of a 12×12 matrix.

Each halftone spot may be formed from four adjacent dots, six adjacent dots, or from some other number of dots. In either case, the center of the halftone spot is set at a desired location without regard to the pitch or arrangement of dots. For example, when the horizontal direction with reference to the point of origin OR located at the lower left end is taken as the X axis and the vertical direction with reference to the same origin is taken as the Y axis, the coordinates of a halftone spot SP1 are set to (8.2, 2.0), and the coordinates of a halftone spot SP2 are set to (10.5, 10.7).

In this case, the halftone spot SP1 is formed from four adjacent dots, and the halftone spot SP2 is formed from nine adjacent dots.

A screen angle defined by the two halftone spots SP1 and SP2 (i.e., the angle of a line connecting the halftone spots) is 14.81° with reference to the Y axis. The screen angle is very close to an angle of 15°; an angle related to an irrational tangent. The distance between the two halftone spots SP1 and SP2 is 9.0 dots long. Since two halftone spots exist between the halftone spots SP1 and SP2, the pitch between the halftone spots shown in FIG. 4 (i.e., the linear distance between the halftone spots) assumes a pitch of 3.0 dots. In the screen whose angle is 0°, realization of a pitch of 3.0 dots is easy. Therefore, the example screen of FIG. 4 can be used as a rotated screen of 0° screen with the same halftone spot pitch (3.0 dots).

Figure 1:
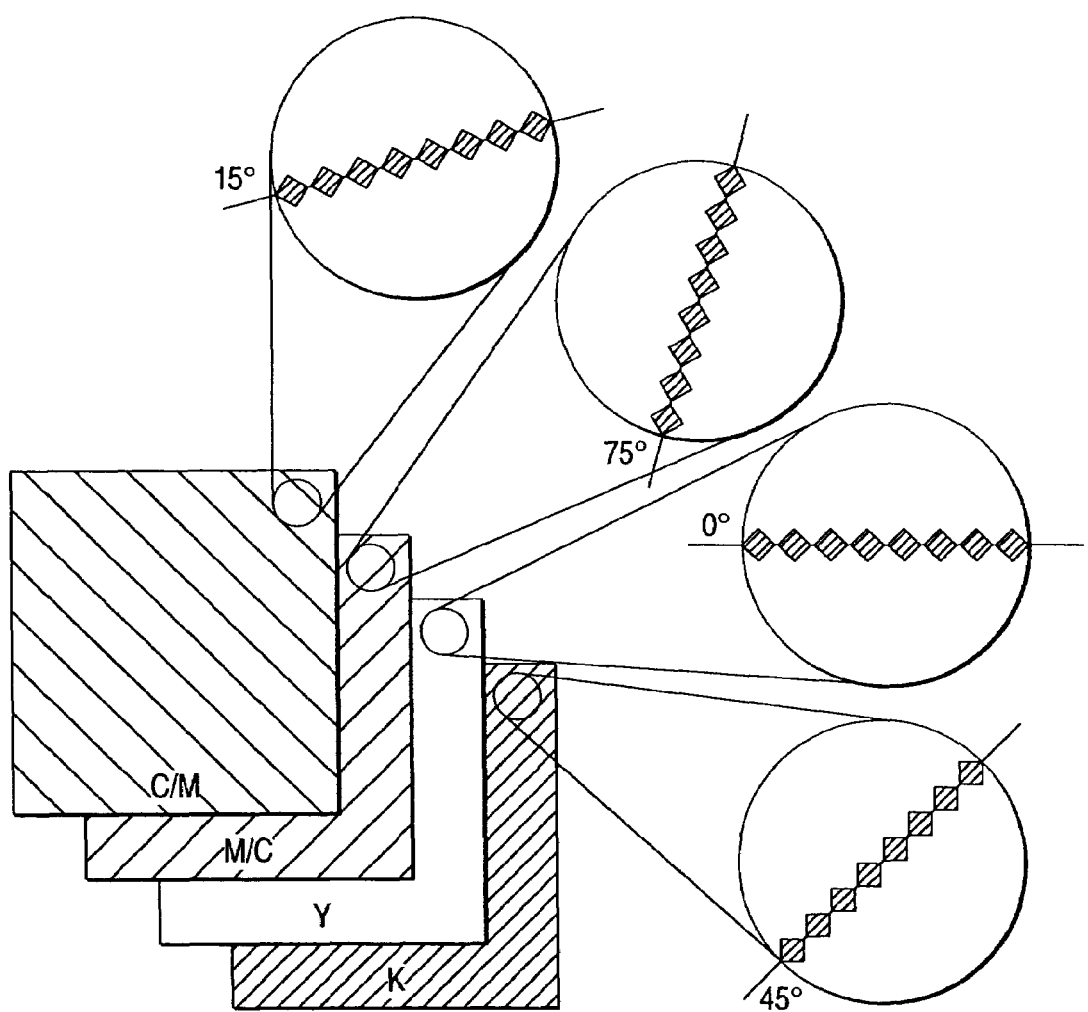
FIG. 1 is an illustration showing the combination of the angle of a cyan screen, the angle of a magenta screen, the angle of a yellow screen, and the angle of black screen, which has conventionally been used in wide applications of industrial printing systems.

In the same manner as mentioned previously, the screen angles of 15° and 45° shown in FIG. 1 can be realized. In this case, the pitch of halftone spots can also be set to a value of 3.0 dots, in the same manner as in the previous example of FIG. 4.

Figure 5:
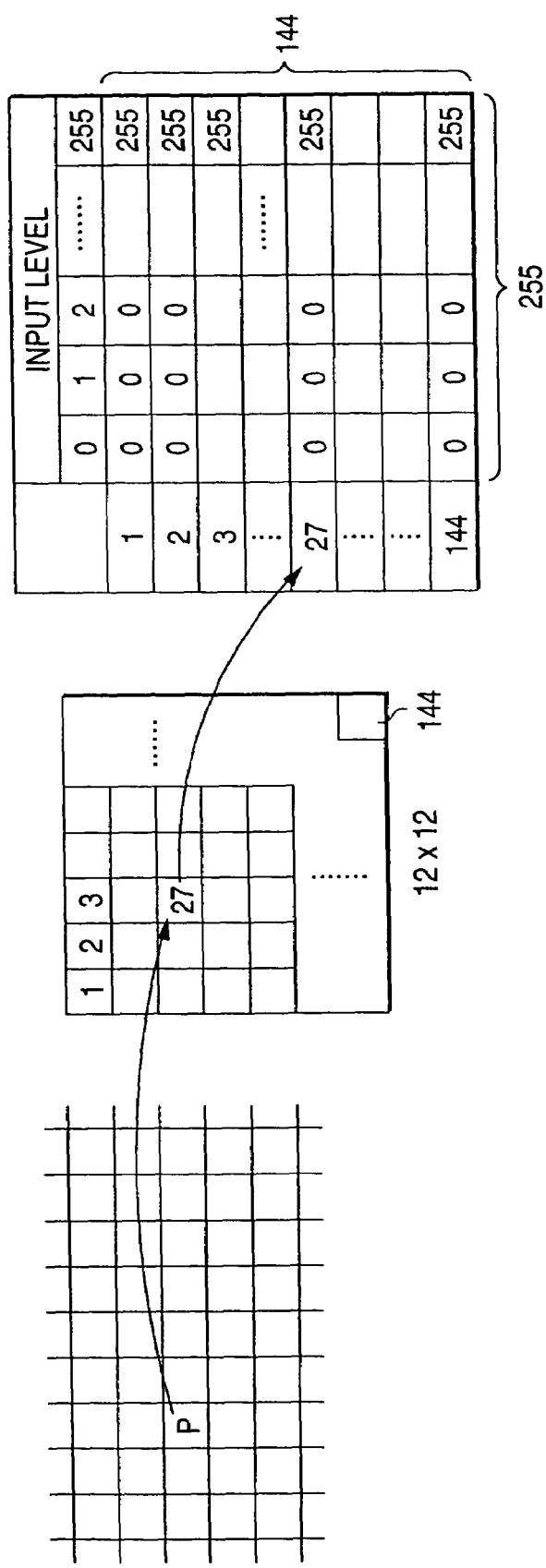
FIG. 5(A)-FIG. 5(C) showing a conversion table used in the first embodiment.

FIG. 5 is schematic representation showing a conversion table used in the first embodiment. The conversion table is ordinarily stored in a halftone processing section provided within an internal controller of an electrophotographic apparatus. Image data shown in FIG. 5(A) comprise halftone data for respective colors corresponding to dots. The halftone data may correspond to a color space of RGB or to a color space of CMYK. CMYK toners are commonly used in a color electrophotographic apparatus. In such a case, the image data comprise halftone data corresponding to Y, M, C, and K, respectively.

A pattern matrix shown in FIG. 5(B) and γ tables shown in FIG. 5(C) are applied to such image data. In the first embodiment, the pattern matrix consists of 12 rows by 12 columns. The γ table are prepared for each element of the pattern matrix and identified by reference number "i" (i=1 to 144). The pattern matrix in FIG. 5(B) contains the reference numbers "i" to the γ table. For instance, given that the reference number of the pattern matrix corresponding to a dot P of image data is 27, image reproduction data corresponding to the dot P are determined by reference to the γ table whose reference number 27. Specifically, image reproduction data (an output value) corresponding to halftone data of image data (an input level) are read by reference to the γ table corresponding to reference number 27.

On the basis of the image reproduction data determined by means of the conversion table, the engine utilizing a laser beam is provided with a laser drive pulse signal modulated by the pulse-width modulation method, activates a laser diode in accordance with the drive pulse, and radiates a laser beam onto a photosensitive drum. Consequently, a laser beam is radiated onto only a region of desired area on the left or right side within a dot, and toner adheres to the thus-irradiated region. The image reproduction data output from the γ table comprise data pertaining to whether the region to be irradiated is on the left or right side of the dot, as well as pulse width data corresponding to the area of the region to be irradiated.

FIG. 6 is an illustration showing an example of the pattern matrix according to the first embodiment. As mentioned above, the pattern corresponds to a matrix having 12 rows and 12 columns. A total of 144 reference numbers (1 to 144) are assigned to elements of the matrix without involvement of an overlap.

Figure 7:
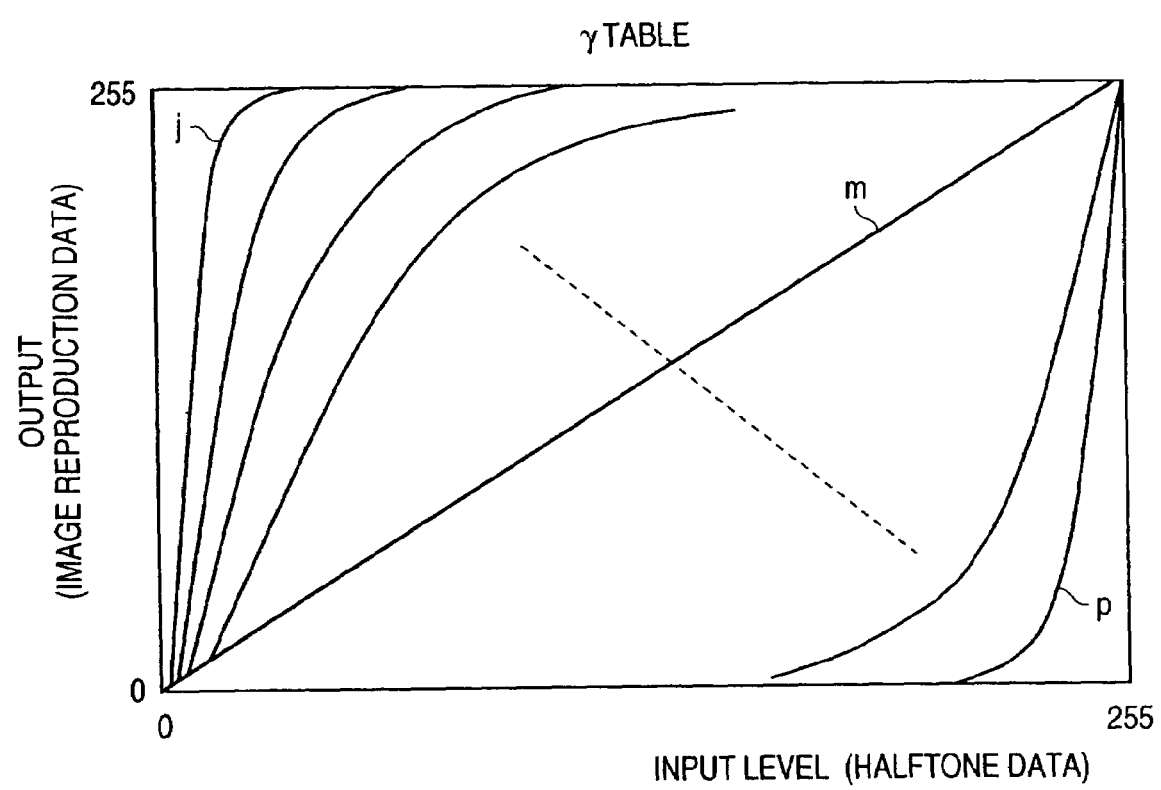
FIG. 7 is a diagrammatic representation of an example of the γ table according to the first embodiment.

FIG. 7 is a diagrammatic representation of an example of the γ table according to the first embodiment. In this table, input levels of halftone data are associated with outputs including image reproduction data pertaining to whether the right or the left side of the dot is to be irradiated with a laser beam and data pertaining to the extent to which the region is to be irradiated. In the example shown in FIG. 7, the γ table assigned to reference number "j" converts low-level input data into high-level output data and corresponds to a dot in the pattern matrix which grows when the input level of the image data is comparatively low. The γ table assigned to reference number "m" converts input data into output data so as to be in proportion to the input data and corresponds to a dot in the pattern matrix which grows when the input level of the image data is comparatively intermediate level. The γ table assigned to reference number "p" corresponds to a dot which does not grow when the input level of image data is low but grows when the input level of the image data has reached a comparatively high level.

In the first embodiment, γ tables of 144 types are associated with the pattern matrix having 12 rows and 12 columns. Consequently, the γ table shown in FIG. 7 also comprises γ curves of 144 types.

An enormous pattern matrix such as 1000×1000 theoretically enables to realize screens with angles related to the irrational tangent or screen sets with equal halftone spot pitch among the screens of different angles. However, since a limitation is imposed on the resolution (dpi) of the engine, the electrophotographic apparatus such as a color page printer cannot utilize such a pattern matrix of enormous magnitude. Further, if an attempt is made to achieve a resolution of about 600 dpi, the pitch between halftone spots becomes too long (consequently, the screen frequency is reduced), so that the resolution of the resultant reproduced image is deteriorated drastically. In the first embodiment, the development region, which is located at a desired position within a dot and has a desired area, is controlled on the basis of the image reproduction data. As a result, even in the case of a small pattern matrix, the position of a halftone spot to grow is controllably set to an arbitrary position where the halftone spot is not limited by the dot pitch or the arrangement of dots, thus achieving screen angles related to the irrational tangent or a uniform pitch of halftone spots.

As shown in FIGS. 5 through 7, there still exists a necessity for providing γ tables of 144 types even in the case of the pattern matrix having 12 rows and 12 columns. Such a large number of γ tables require a large memory capacity.

In a second embodiment of the present invention, the total number of γ tables is diminished by collecting, into a single table, γ tables assigned the same output for an input level.

Figure 8:
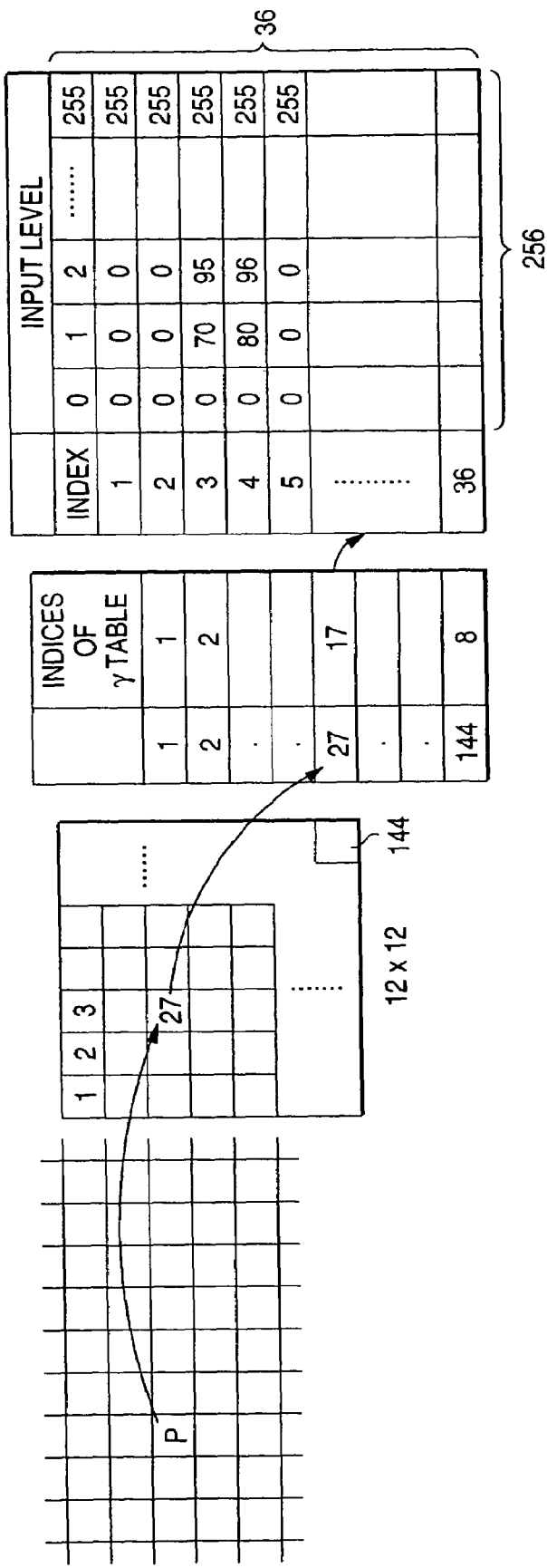
FIG. 8(A)-FIG. 8(C) showing index-type conversion tables according to a second embodiment of the present invention.

FIG. 8 shows index-type conversion table according to the second embodiment. In contrast with the conversion table shown in FIG. 5, wherein individual γ tables are assigned to respective elements of the pattern matrix, an index of the γ table is assigned to respective elements of the pattern matrix. The γ table is sought by reference to an index table. Consequently, a single γ table can be shared among a plurality of elements of the pattern matrix, and the number of γ tables can be set to a small value independently of the pattern matrix.

Figure 2:
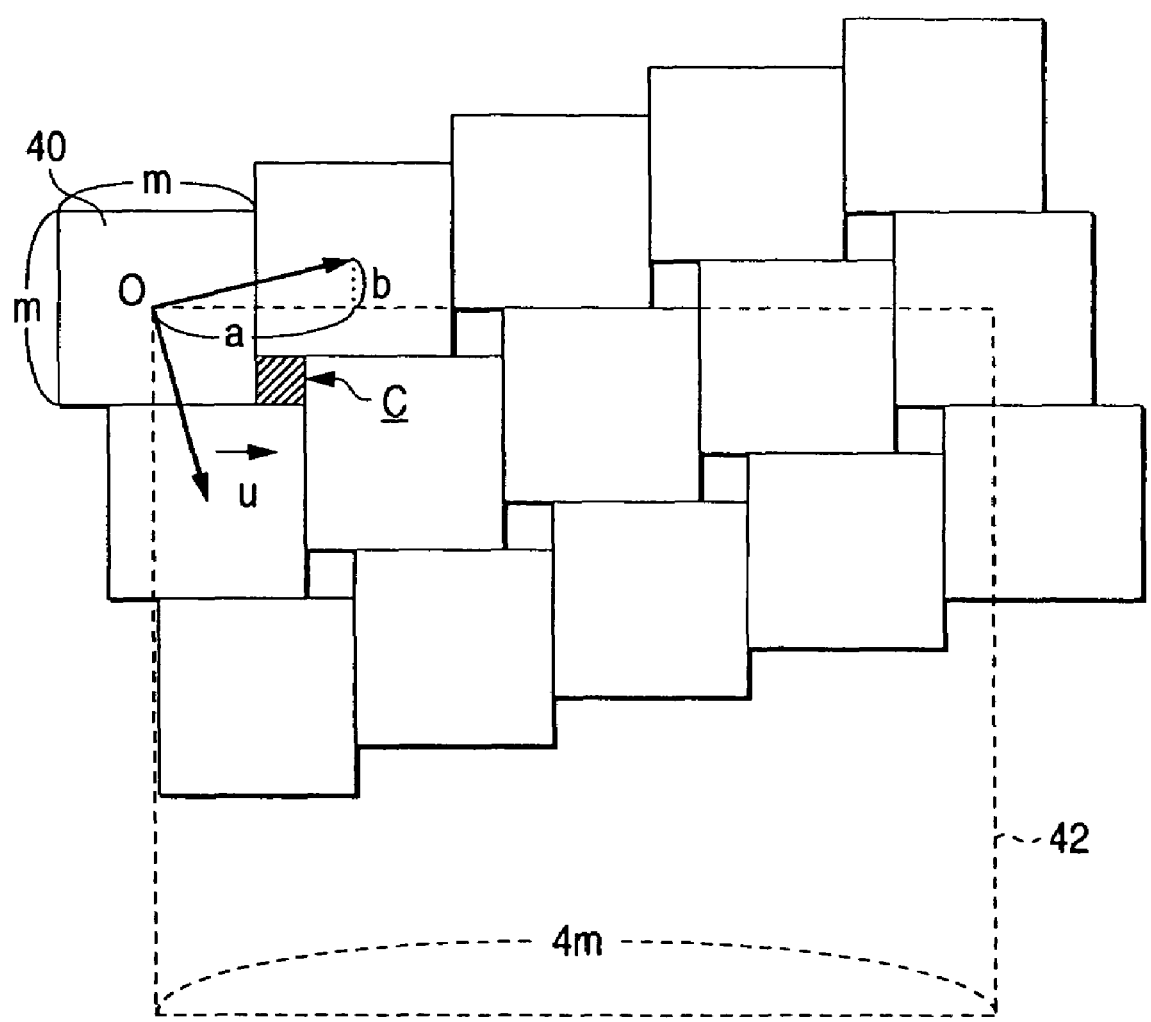
FIG. 2 is an illustration for describing a conventional method of determining screen angles.

As shown in FIG. 2, in a screen whose angle has a rational tangent (hereinafter called a "rational tangent screen"), dots appear, in the form of completely identical patterns, in positions spaced apart from one another by a given distance in the longitudinal direction and a given distance in the lateral direction. Accordingly, dots can be designated with in a square matrix of finite size without involvement of errors. Further, dots appear within the square matrix in the form of completely identical patterns. In this sense, the index-type conversion table is advantageous in the case of the rational tangent screen.

Strictly speaking, halftone spots of the same pattern do not appear in the irrational tangent screen. In the second embodiment, 144 γ tables are classified into a group of tables corresponding to halftone spots whose right portions are development regions (i.e., regions exposed to a laser beam) and another group of matrices corresponding to halftone spots whose left portions are development regions. Of the plurality of thus-classified γ-tables, γ tables with similar input-output correspondence are collected. The thus-collected adjacent γ tables are assigned a single index.

FIG. 9 is an illustration showing an example of a pattern matrix according to the second embodiment. The pattern matrix shown in FIG. 9 represents, in the form of a single pattern matrix, the pattern matrix shown in FIG. 8(B) and the index table shown in FIG. 8(C). In the pattern matrix shown in FIG. 6 in connection with the first embodiment, different γ tables are assigned to all the elements of the matrix having 12 rows and 12 columns. In contrast, in the example shown in FIG. 9, γ tables of 36 types are assigned to 144 elements of the matrix having 12 rows and 12 columns. Numbers assigned to 144 elements shown in FIG. 9 designate indices of the γ tables. Accordingly, γ tables are understood to be assigned to the elements in an overlapping manner. For example, the γ table assigned number 1 is allocated to elements $D_{1,1}$, $D_{1,4}$, $D_{2,7}$, $D_{3,10}$, $D_{7,12}$, and $D_{10,11}$ of the pattern matrix.

As mentioned above, the total number of γ tables can be diminished by collecting γ tables assigned to dots whose development regions are on the same side and which output substantially the same value in response to an input. Specifically, the adjacent γ tables of the γ tables shown in FIG. 7 are collected into a single group.

Figure 10:
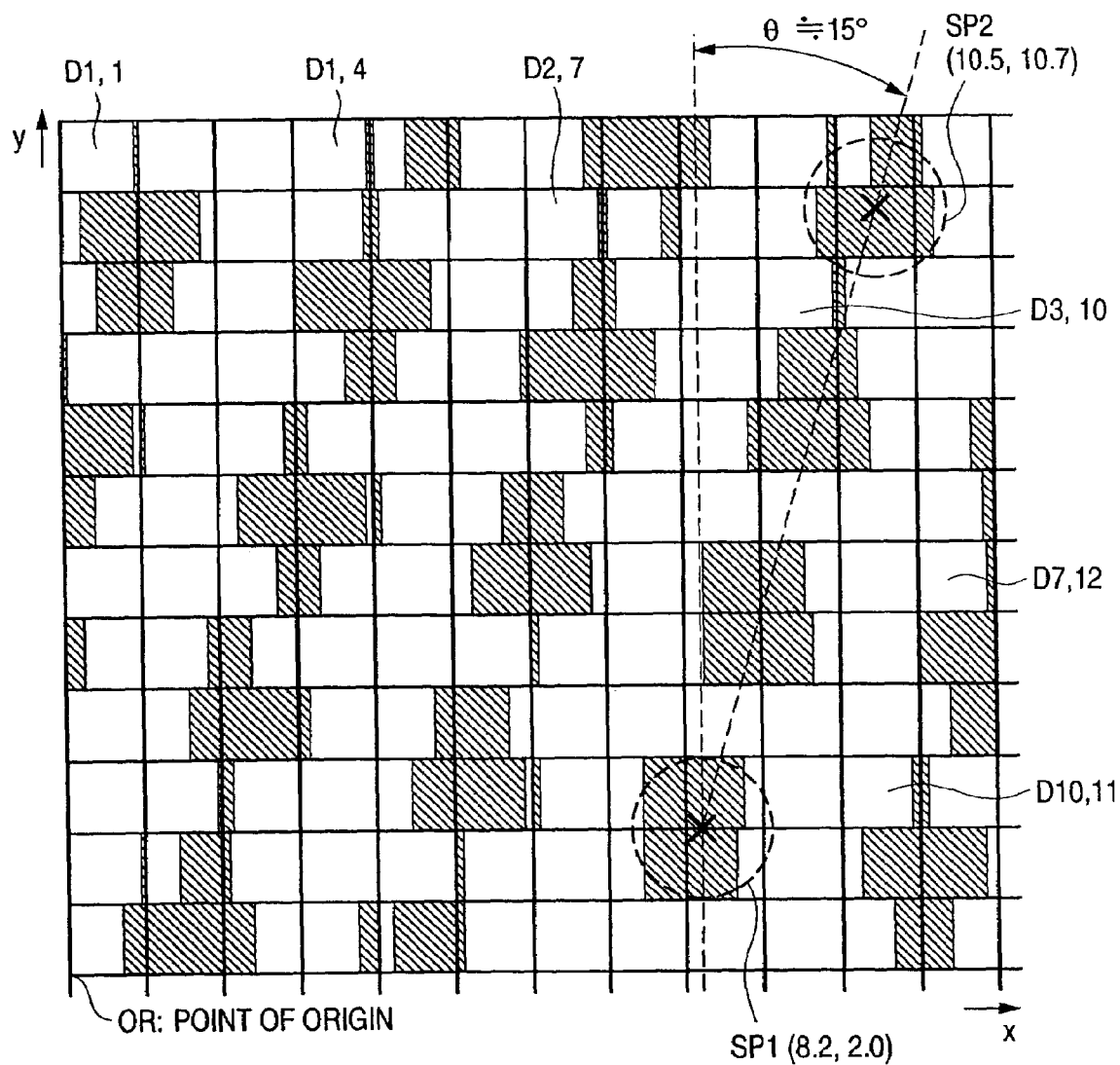
FIG. 10 shows an example of halftone spots that have been grown according to the second embodiment.

FIG. 10 shows an example of halftone spots that have been grown according to the second embodiment. Even in this example, the development regions formed in respective dots differ in position and area from one dot to another. Consequently, the center coordinates of the grown halftone spot SP1 are (8.2, 2.0), and the center coordinates of the grown halftone spot SP2 are (10.5, 10.7). The halftone spots SP1 and SP2 can be placed in the same positions as those shown in FIG. 4. At this time, the screen angle θ assumes a value of about 15°, and the pitch of the halftone dot assumes a value of 3.0, as in the case of the example shown in FIG. 4.

As is evident from comparison between the example shown in FIG. 4 and the example shown in FIG. 10, the dots $D_{1,1}$, $D_{1,4}$, $D_{2,7}$, $D_{3,10}$, $D_{7,12}$, and $D_{10,11}$ shown in FIG. 4 correspond to dots whose right-side portions are developed or remain substantially undeveloped. In contrast, as a result of allocation of the single γ table to the corresponding dots shown in FIG. 10, the right-side portions of all the dots are developed to the same area.

[Electrophotographic Apparatus System]

FIG. 11 is a schematic diagram showing the configuration of an electrophotographic system. In this example, a host computer 50 produces image data 56 comprising RGB halftone data (each data set including eight bits, and the halftone data comprise a total of 24 bits). The RGB halftone data are delivered to an electrophotographic apparatus 60 such as a page printer. On the basis of supplied image data 56, the electrophotographic apparatus 60 reproduces a color image. The electrophotographic apparatus 60 comprises a controller 62 which processes an image and supplies laser drive data 69 to an engine, and an engine 70 which reproduces an image according to the drive data 69.

By means of an application program 52, such as a word processing program or a graphic tool, the host computer 50 produces text data, graphic data, bit-map data or the like. The data sets produced by the application program 52 are rasterized by means of a electrophotographic apparatus driver software 54 installed in the host computer 50. The thus-rasterized data sets are converted into the image data 56, each pixel or dot of which comprises respective RGB halftone data sets.

The electrophotographic apparatus 60 is provided with an unillustrated built-in microprocessor, and the microprocessor, in combination with a control program installed therein, constitutes a controller 62 including a color conversion section 64, a halftone processing section 66, and a pulse-width modulation section 68. The engine 70; e.g., a laser driver 72, activates a laser diode 74 for drawing an image on the basis of the drive data 69. Although the engine 70 comprises a photosensitive drum, a transfer belt, and a drive section, these elements are omitted from FIG. 11.

The color conversion section 64 provided within the controller 62 converts RGB halftone data 56 that are supplied for each dot, into CMYK halftone data 10 which are complementary to the RGB data. In the CMYK halftone data 10, each color halftone data set comprises 8 bits and a maximum of 256 gray scales. The color conversion section 64 converts the RGB halftone data 56 for each dot into the halftone data 10 for each plane dot of the respective CMYK colors. Consequently, the halftone processing section 66 is supplied with the halftone data 10 corresponding to a plane dot of the respective color.

By reference to a previously-prepared conversion table defining the correspondence between halftone data and image reproduction data, the halftone processing section 66 produces, from the halftone data 10 for each dot, the image reproduction data 30 for each dot. The halftone processing section 66 produces the image reproduction data 30, which represent halftones, by utilization of; e.g., a multivalued dithering method. For example, through use of the conversion table comprising the pattern matrices and the γ tables shown in FIGS. 5 to 9, for each dot the halftone processing section 66 can produce the image reproduction data 30 which represent the right or left region and the area of the region.

In a preferred embodiment, through use of the multivalued dithering method, a color printer of as low dot per inch as 600 dpi is possible to have a high resolution by a high frequency screen with small spot pitch, and also halftone processing section 66 can set the center of a halftone spot at an arbitrary position regardless of the position of the dot. As a result, irrational tangent screens can be realized, and the pitch of halftone spots among screens of different colors having different angles can be made substantially equal.

FIG. 12 is a schematic diagram showing another configuration of the electrophotographic system. This configuration corresponds to a modification of the system configuration shown in FIG. 11. In the system shown in FIG. 12, a driver software 80 installed in the host computer 50 has a rasterization function 54, the color conversion function 64, and the halftone processing function 66. These functions 54, 64, and 66 are analogous to the functions of the elements assigned the same reference numerals shown in FIG. 11. The image reproduction data 30 produced for each color by means of the halftone processing function 64 are supplied to the pulse-width modulation section 68 of the controller 62 provided within the electrophotographic apparatus 60, such as a page printer, where the data are converted into the desired drive data 69 and delivered to the engine 70.

In the example of the system configuration shown in FIG. 12, the driver software 80 installed in the host computer 50 performs color conversion and halftone processing operations. In the example shown in FIG. 11, the controller provided within the electrophotographic system performs color conversion and halftone processing operations. In the example shown in FIG. 12, the host computer 50 performs conversion and halftone processing operations. If demand exists for the electrophotographic apparatus 60 to be inexpensive, the price of the apparatus is required to be diminished by reducing the capability of the controller 62. In such a case, an effective measure is to implement the color conversion processing and the halftone processing, which are portions of the functions offered by the controller shown in FIG. 11, by means of the driver program installed in the host computer. In a case where the driver 80 performs halftone processing, the storage medium having recorded thereon a program for causing the computer to perform the foregoing halftone processing procedures is incorporated into the host computer 50.

As mentioned above, the present invention enables the electrophotographic device capable of reproducing only a limited dot density to materialize screen angles substantially related to an irrational tangent with a small pitch of halftone spots and high resolution. Further, the all pitches of halftone spots of different color screens having different angles can be made substantially equal at a limited dot density.

What is claimed is:

1. A color electrophotographic apparatus which reproduces an image by utilization of a plurality of color toners and by expressing halftone of each color through use of halftone spots formed from a plurality of dots, said apparatus comprising:

a halftone processing section which is provided with halftone data for respective colors and which reproduces image reproduction data by reference to a conversion table defining a correspondence between the halftone data and image reproduction data; and an image reproduction engine which is provided with a drive signal corresponding to the image reproduction data to thereby cause the toners to adhere to a development region whose area and location correspond to the image reproduction data, within the dots, wherein said halftone processing section prepares the image reproduction data to be used for changing an angle of at least one color screen of a plurality of color screens to substantially an angle related to an irrational tangent.

2. A color electrophotographic apparatus according to claim 1, wherein said image reproduction engine radiates a beam to the development region to thereby causes the toners to adhere to the development region, and the image reproduction data comprise data pertaining to a position and an area to be exposed within the dot in a scanning direction of the beam.

3. A method of processing an image of color electrophotography by utilization of a plurality of color toners and by expressing halftone of each color through use of halftone spots formed from a plurality of dots, said method comprising:

a halftone processing process, in which halftone data are provided for respective colors and the image reproduction data corresponding to the dots are produced on the basis of the halftone data by reference to a conversion table defining the correspondence between the halftone data and image reproduction data; and an image reproduction process, in which a drive signal corresponding to the image reproduction data is provided and the toners are caused to adhere to a development region whose area and location correspond to the image reproduction data, within the dots, wherein, in the halftone processing process, there are produced the image reproduction data to be used for changing an angle of at least one color screen of a plurality of color screens to substantially an angle related to an irrational tangent.

* * * * *